United States Patent Office

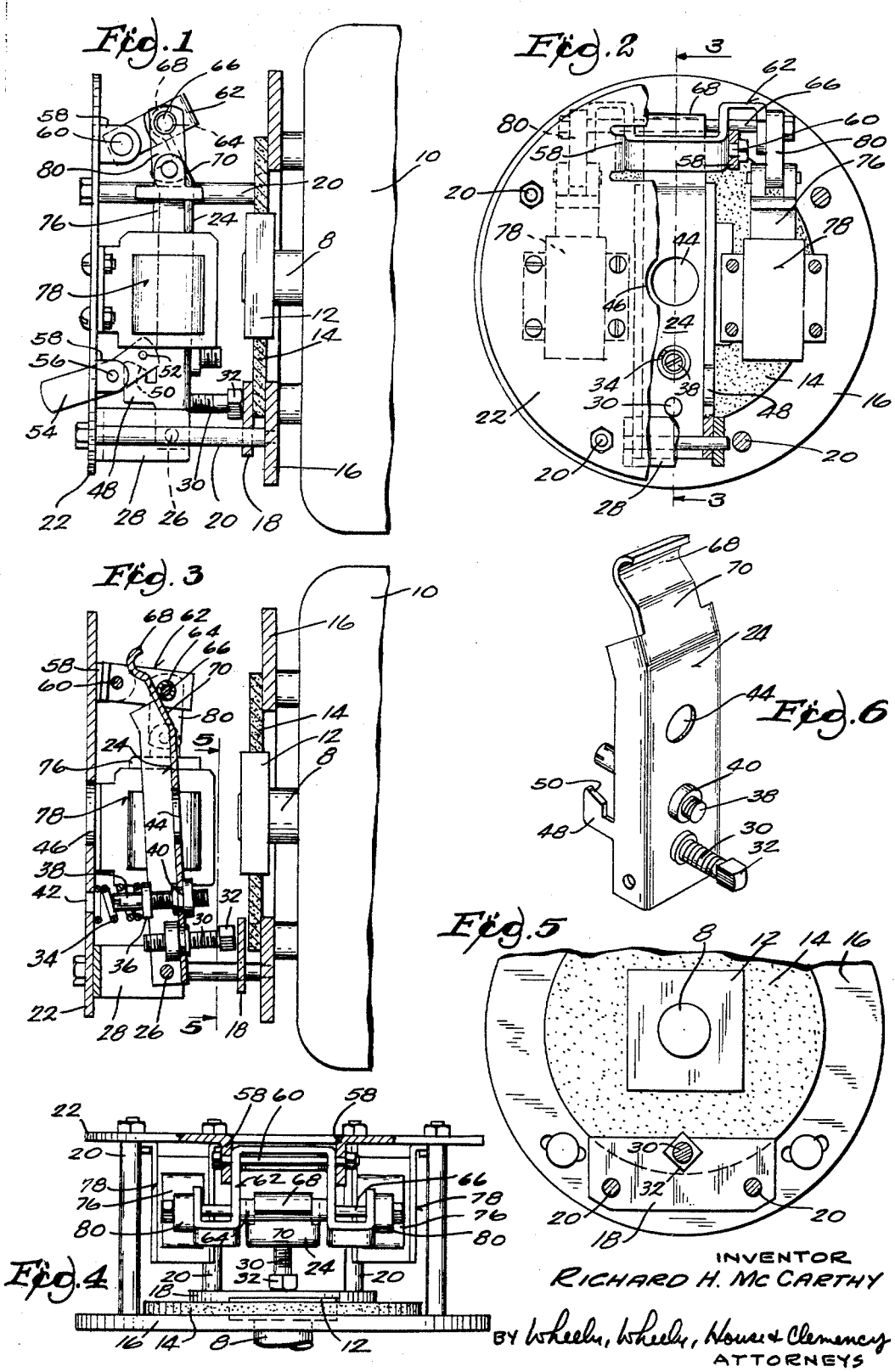

3,500,971
Patented Mar. 17, 1970

3,500,971
ELECTROMAGNETICALLY RELEASED SPRING-APPLIED CALIPER BRAKE
Richard H. McCarthy, Milwaukee, Wis., assignor to Stearns Electric Corporation, Milwaukee, Wis., a corporation of Wisconsin
Filed Sept. 12, 1967, Ser. No. 667,225
Int. Cl. B60t 13/04
U.S. Cl. 188—171                                                                                       4 Claims

ABSTRACT OF THE DISCLOSURE

A brake plate applicable to the end of a motor has rearwardly projecting studs which support brake applying and releasing mechanisms for clamping to said plate a friction disk carried by the armature shaft of the motor. The said mechanism includes a lever having an adjustable brake-applying screw at its lower end, and cam surfaces at its upper end engageable by a solenoid-operated U-shaped lever for releasing the brake. Either one or two solenoids are employed, the arrangement permitting the brake to be applied to a motor having an armature shaft so long as to project through the brake mechanism. The spring which applies the brake, and the manually operable release cam, are both located to engage the lever below the level of an extended armature shaft.

BACKGROUND OF INVENTION

Reference is made to a companion application Ser. No. 635,751, filed by me May 3, 1967, and disclosing a spring-applied magnetically released caliper brake structure of the same general type as that here involved but not adapted to meet the specific purposes for which the instant brake has been designed.

SUMMARY OF THE INVENTION

The device of the present invention is very versatile by reason of the disposition of the parts around the top, sides, and bottom of the back plate, leaving the center open. The structure makes it possible to use either one or two solenoids and to employ the device with an armature shaft which is either a stub shaft or a through shaft, and to employ as many plates as may be required to handle the torque.

BRIEF DESCRIPTION OF DRAWINGS

FIG. 1 is a side elevation of a brake mechanism embodying the invention as applied to a motor fragmentarily illustrated, portions of the brake elements being broken away.

FIG. 2 is a view of the device of FIG. 1 in rear elevation with portions broken away.

FIG. 3 is a view taken in section on the line 3—3 of FIG. 2 with the motor being shown in side elevation.

FIG. 4 is a plan view of the device of FIGS. 1–3 with portions broken away.

FIG. 5 is a fragmentary view taken in section on the line 5—5 of FIG. 3.

FIG. 6 is an enlarged detail perspective view of the brake operating lever.

DETAILED DESCRIPTION

The armature shaft 8 of motor 10 carries the usual square hub 12 on which the brake disk or disks 14 are mounted to rotate with the shaft, while being free for movement axially.

The brake mechanism comprises a mounting plate 16 which provides a friction surface to which the floating disk 14 may be pressed by the non-rotatable plate 18 guided on shoulder studs 20. These studs project rearwardly from the mounting plate 16 to provide support for the back plate 22, on which all of the operating mechanism is mounted.

A pressure lever 24 is pivoted on pin 26 carried by the U-bracket 28 fastened to the back plate 22. The lever 24 carries just about its fulcrum an adjustable bolt 30, the head 32 of which bears against the plate 18 to exert clamping pressure which confines the friction disk 14 between plate 18 and mounting plate 16.

Pressure is derived from a compression spring 34 seated at its rear end against the back plate 22 and at its forward end upon a shoulder 36 of screw 38, the latter being adjustably mounted by lock nut 40 on the lever 24. The adjustability of the seat 36 provided by the screw 38 permits the pressure to be adjusted readily. Screw 38 has its slot accessible through an opening 42 in the back plate 22.

In line with the armature shaft 8, the lever 24 has an opening 44 with which registers an opening 46 in the back plate 22. These registering openings make it possible to use the device regardless of the length of the armature shaft 8 of the motor. An elongated armature shaft can project through the aligned apertures 44 and 46.

The brake is released by oscillating the lever 24 counterclockwise as viewed in FIG. 1 and FIG. 3. Such oscillation in opposition to the bias of spring 34, can be achieved either manually or by power. For manual release, the lever 24 is provided with a hooklike arm 48 beveled at 50 to provide a cam follower surface engaged by a pin 52 on a lever 54 which is pivoted at 56 to a bracket 58 on the back plate 22. Oscillation of the lever 54 in a clockwise direction as viewed in FIG. 1 will effect interaction of pin 52 with cam follower surface 50 to oscillate the lever 24 counterclockwise on its fulcrum 26, thereby relieving pressure on the brake members.

Operation by power may likewise be the result of a camming operation. At transversely spaced points on the back plate 22, there are bracket arms 58 which support a pintle pin 60 on which a U-shaped lever 62 is pivoted. The camming roller 64 on the cross pin 66 of lever 62 is normally engaged with the rearwardly inclined portion 70 of the lever 24. In this position of the parts, the clutch members are engaged as shown in FIG. 1. A transverse channel 68 formed at the end of lever 62 prevents over-travel of the roller 68 when the solenoids are deenergized.

When the lever 62 is oscillated clockwise to the position of FIG. 3, the roller 64 carried thereby moves downwardly along the inclined upper end portion 70 of the lever to cam the lever rearwardly against the bias of spring 34, thereby releasing the brake members as shown in FIG. 3.

To effect clockwise movement of the U-shaped lever 62, I may use one or more solenoids which are located at one or both ends of the lever connected with cross pin 66 which supports the camming roller 64. FIG. 2 shows two solenoids, one being illustrated in full lines and one in dotted lines, the latter being partially concealed by the back plate 22. Either or both solenoids 78 will operate the lever, the armature or armatures 76 being connected by the link or links 80 with the aforesaid pin 66. It will be apparent that whether one solenoid is used or two solenoids are used, there will not be, in any case, any interference with a shaft passing through the brake mechanism if it so happens that the device is on an elongated shaft.

Because the solenoids operate through a camming mechanism at the end of lever 24 and therefore have great mechanical advantage over the spring 34, it will be apparent that a single solenoid of low power will be entirely adequate to release the brake unless a very strong spring is used at 34 to bias the brake during its engaging position.

It will be understood that the application of the device to a motor shaft is merely illustrative, since the device will operate to brake any shaft and not merely the shaft of the motor. When associated with the motor, it is usual to connect the solenoid or solenoids in such a manner that they will be energized when the motor is energized, thereby releasing the brake to permit free rotation of the shaft 8, deenergization of the motor allowing immediate braking of such shaft.

I claim:

1. A brake comprising friction brake elements movable toward and from each other and provided with mounting means restraining them from rotation, a shaft provided with a brake disk disposed between said elements and adapted to be clamped therebetween in the relative movement of said elements toward each other, and brake operating means comprising a U-shaped lever having a cam roller engaging an inclined cam track with which one of said elements is provided, spring means biasing said lever in a direction to bias said elements into clamping engagement with said disk, means providing an adjustable spring seat on said lever which consists of a shouldered bolt in adjustable connection with said lever, the shoulder of said bolt constituting said seat for the spring means, and means including a laterally offset solenoid having an armature and a link connecting the armature for transmitting motion to said lever for the operation thereof in opposition to the bias of said spring means.

2. A brake comprising a mounting plate having a friction surface, a brake disk having means for supporting it on a shaft to be braked, said disk being engageable with the friction surface of the mounting plate, a pressure element having a friction surface engageable with the disk and having means supporting it for movement toward and from the mounting plate for clamping engagement and release of the disk, said means comprising arms projecting rearwardly from the mounting plate and upon which said element is slidable, a back plate carried by said arms from the mounting plate, an operating lever having a pintle adjacent said arms, the back plate having bracket means carrying said pintle, a thrust member mounted on the lever and engageable with said element for urging it toward the mounting plate, spring means acting on the lever in a direction to bias the lever and thrust member toward brake applying position, the lever having a free end provided with an inclined camming surface, a second lever having means supporting it pivotally from the back plate and having a cam engageable with the camming surface in a direction to retract the first mentioned lever against the bias of said spring for releasing the brake.

3. A brake according to claim 2 in which the second lever includes an arm laterally offset from said camming means, together with a solenoid for the operation of the second lever by the oscillation of said arm, said solenoid having an armature, and a link pivotally connecting the armature with the arm, the solenoid being laterally offset from the axis of rotation of said brake disk.

4. A brake according to claim 3 in which said second lever is U-shaped and has two arms which are laterally offset in opposite direction, there being separate solenoids provided with armatures and links operatively connecting their respective armatures with the respective arms.

References Cited

UNITED STATES PATENTS

| 2,215,909 | 9/1940 | McWhirter et al. | 188—171 |
| 2,939,551 | 6/1960 | Hansen | 188—171 |
| 3,221,845 | 12/1965 | Hansen | 188—171 |

DUANE A. REGER, Primary Examiner

U.S. Cl. X.R.

188—71